United States Patent
Matake

(10) Patent No.: US 9,937,594 B2
(45) Date of Patent: Apr. 10, 2018

(54) METHOD OF MACHINING WORKPIECE BY COOPERATION OF MACHINE TOOL AND ROBOT

(71) Applicant: FANUC CORPORATION, Yamanashi (JP)

(72) Inventor: Kazuyoshi Matake, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 60 days.

(21) Appl. No.: 15/276,867

(22) Filed: Sep. 27, 2016

(65) Prior Publication Data

US 2017/0087676 A1    Mar. 30, 2017

(30) Foreign Application Priority Data

Sep. 29, 2015    (JP) ................................ 2015-191935

(51) Int. Cl.
*B23P 23/04*    (2006.01)
*B23Q 7/04*    (2006.01)
(Continued)

(52) U.S. Cl.
CPC .............. *B23P 23/04* (2013.01); *B23Q 3/069* (2013.01); *B23Q 7/047* (2013.01); *B25J 13/085* (2013.01);
(Continued)

(58) Field of Classification Search
CPC . B23Q 1/25; B23Q 1/64; B23Q 3/002; B23Q 3/06; B23Q 3/069; B23Q 3/105;
(Continued)

(56) References Cited

U.S. PATENT DOCUMENTS

| 4,611,377 A | * | 9/1986 | McCormick | ....... B23Q 3/15553 |
| | | | | 29/407.05 |
| 7,448,120 B2 | * | 11/2008 | Ohmori | ................... B23C 3/002 |
| | | | | 269/258 |

(Continued)

FOREIGN PATENT DOCUMENTS

| DE | 3420531 A1 | 12/1985 |
| FR | 2969947 A1 | 7/2012 |

(Continued)

OTHER PUBLICATIONS

English Abstract and Machine Translation for Japanese Publication No. 2017-019049 A, published Jan. 26, 2017, 10 pgs.

(Continued)

*Primary Examiner* — Matthew P Travers
(74) *Attorney, Agent, or Firm* — Fredrikson & Byron, P.A.

(57) ABSTRACT

A method for machining a workpiece which can prevent a reduction in machining accuracy and production efficiency. The method includes pressing a clamp part against a first portion of the workpiece, to clamp the workpiece in cooperation with a workpiece receiving part, causing the clamp part to move away from the first portion, to release the workpiece, which has been clamped by the clamp part, operating a robot to cause a robot hand to grasp a second portion of the workpiece, which is different from the first portion, to restrict the movement of the workpiece relative to the workpiece receiving part without a change in the posture of the workpiece, and operating a machine tool to machine the first portion while restricting the movement of the workpiece relative to the workpiece receiving part.

2 Claims, 10 Drawing Sheets

(51) Int. Cl.
*B23Q 3/06* (2006.01)
*B25J 13/08* (2006.01)
*B23Q 17/00* (2006.01)

(52) U.S. Cl.
CPC ...... *B23C 2220/48* (2013.01); *B23C 2270/08* (2013.01); *B23Q 17/005* (2013.01); *B23Q 2703/00* (2013.01); *Y10T 29/49998* (2015.01)

(58) Field of Classification Search
CPC .......... B23Q 7/04; B23Q 7/046; B23Q 7/047; B23Q 2703/00–2703/02; B23Q 2707/04; Y10T 29/49998; Y10T 29/49995; Y10T 29/49996; B23C 1/06; B23C 3/00; B23C 2220/48; B23C 2270/08; B23P 23/04; B25J 9/0096; B25J 11/005; B23F 23/02; B23F 23/04
USPC ............ 409/7, 131–132, 159, 163–164, 205, 409/219–227; 279/126
See application file for complete search history.

(56) References Cited

U.S. PATENT DOCUMENTS

| | | | | |
|---|---|---|---|---|
| 2005/0191140 | A1* | 9/2005 | Killer | B23C 3/18 409/132 |
| 2009/0116915 | A1* | 5/2009 | Kawasumi | B23B 3/065 483/14 |
| 2011/0085865 | A1* | 4/2011 | Yoshimoto | B23B 49/04 408/1 R |
| 2011/0236146 | A1* | 9/2011 | De Koning | B23Q 7/1431 409/131 |
| 2014/0049011 | A1* | 2/2014 | Mikoleizig | B23B 31/26 279/126 |
| 2015/0273644 | A1* | 10/2015 | Neubauer | B23B 31/16 279/126 |
| 2017/0008177 | A1* | 1/2017 | Ebihara | B25J 19/0075 |

FOREIGN PATENT DOCUMENTS

| | | |
|---|---|---|
| JP | 8197164 A | 8/1996 |
| JP | 9201742 A | 8/1997 |
| JP | 2002542954 A | 12/2002 |
| JP | 2009184055 A | 8/2009 |
| JP | 201719049 A | 1/2017 |

OTHER PUBLICATIONS

English Abstract and Machine Translation for French Publication No. 2969947 A1, published Jul. 6, 2012, 5 pgs.
English Abstract and Machine Translation for Japanese Publication No. 2002-542954 A, published Dec, 17, 2002, 8 pgs.
English Abstract and Machine Translation for Japanese Publication No. 08-197164 A, published Aug. 6, 1986 10 pgs.
English Abstract and Machine Translation for German Publication No. 3420531 A1, published Dec. 5, 1985, 7 pgs.
Untranslated Decision to Grant mailed by Japan Patent Office (JPO) for Application No. JP 2015-191935, Oct. 20, 2017, 3 pages.
English machine translation Decision to Grant mailed by Japan Patent Office (JPO) for Application No. JP 2015-191935,Oct. 20, 2017, 3 pages.
English Abstract and Machine Translation for Japanese Publication No. 09-201-742 A, published Aug. 5, 1997, 8 pgs.
English Abstract and Machine Translation for Japanese Publication No. 2009-184055 A, published Aug. 20, 2009, 6 pgs.

* cited by examiner

US 9,937,594 B2

METHOD OF MACHINING WORKPIECE BY COOPERATION OF MACHINE TOOL AND ROBOT

BACKGROUND OF THE INVENTION

1. Field of the Invention

The invention relates to a method of machining a workpiece by cooperation of a machine tool and a robot.

2. Description of the Related Art

A machining system provided with a robot which grasps and transfers a workpiece, and places the workpiece on a jig has been known (see, for example, Japanese Unexamined Patent Publication (Kokai) No. 2009-184055). Further, a machine tool provided with a clamp mechanism for clamping a workpiece, to machine the workpiece placed on a jig has been known (see, for example, Japanese Unexamined Patent Publication (Kokai) No. 9-201742).

When a clamp mechanism presses a work piece, which has been placed on a jig, against a clamp mechanism, the portion of the workpiece, which abuts with the clamp mechanism, cannot be machined. Thus, conventionally, in order to machine this portion, another operation, for example, placing the workpiece on another jig is necessary in some cases. In this respect, a reduction of machining accuracy and production efficiency may arise.

SUMMARY OF THE INVENTION

In an aspect of the invention, a method of machining a workpiece by cooperation of a machine tool, which includes a workpiece receiving part on which the workpiece is placed and a clamp part which presses the workpiece against the workpiece receiving part, and a robot, which includes a robot hand capable of gripping the workpiece, comprises pressing the clamp part against a first portion of the workpiece and clamping the workpiece between the clamp part and the workpiece receiving part.

The method comprises moving the clamp part so as to separate away from the first portion, and releasing the workpiece from the clamp part, operating the robot so as to grip a second portion of the workpiece, which is different from the first portion, by the robot hand, and restricting a movement of the workpiece relative to the workpiece receiving part without changing a posture of the workpiece, and operating the machine tool so as to machine the first portion when restricting the movement of the workpiece relative to the workpiece receiving part.

The robot may include a force sensor which measures a force applied to the robot hand. When the second portion is gripped by the robot hand, a pressing force, by which the robot hand presses the second portion, may be controlled to a predetermined value based on the force measured by the force sensor.

BRIEF DESCRIPTION OF THE DRAWINGS

The above-mentioned or other objects, features, and advantages of the invention will be clarified by the following description of preferred embodiments with reference to the accompanying drawings, in which.

DETAILED DESCRIPTION

Figure 1:
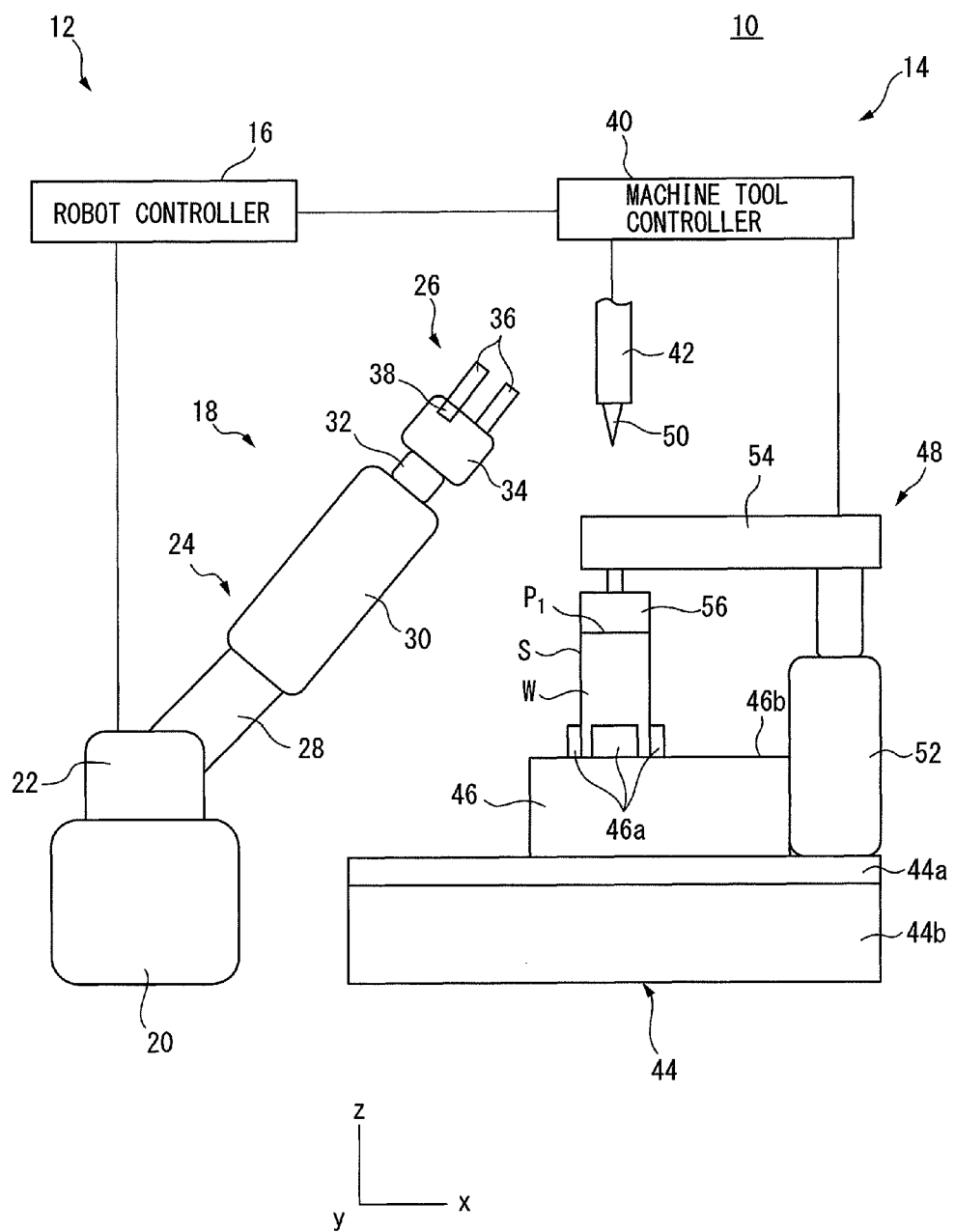
FIG. 1 is a block diagram of a machining system according to an embodiment of the invention.

Embodiments of the invention will be described below in detail with reference to the drawings. First, with reference to FIGS. 1 and 2, a machining system 10 according to an embodiment of the invention will be described. The machining system 10 includes a robot system 12 and a machine tool 14.

The robot system 12 is for carrying a workpiece W into the machine tool 14 so as to place it on a workpiece receiving part 46 of the machine tool 14, and removing the workpiece W placed on the workpiece receiving part 46 from the machine tool 14.

The robot system 12 includes a robot controller 16 and a robot 18. The robot controller 16 includes e.g. a central processing unit (CPU) and a memory (both are not shown), and directly or indirectly controls each component of the robot 18.

The robot 18 is e.g. a vertical articulated robot, and includes a robot base 20, a revolving drum 22, a robot arm 24, a robot hand 26, and a force sensor 38. The robot base 20 is fixed on a floor of a work cell. The revolving drum 22 is attached to the robot base 20 so as to revolve about a vertical axis.

The robot arm 24 includes an upper arm 28 rotatably attached to the revolving drum 22, and a forearm 30 rotatably attached to a distal end of the upper arm 28. A wrist 32 is provided at a distal end of the forearm 30. The robot hand 26 is attached to the distal end of the forearm 30 via the wrist 32.

The robot hand 26 includes a hand base 34 attached to the wrist 32, and a plurality of fingers 36 attached to the hand base 34 so as to be able to open and close. The fingers 36 are provided at the hand base 34 so as to be movable in directions toward and away from each other.

The robot controller 16 sends a command to each servo motor (not shown) built in the robot 18 so as to operate the robot 18, thereby the robot hand 26 is moved. Further, the robot controller 16 sends a command to each servo motor (not shown) built in the robot hand 26 so as to open and close the fingers 36.

The force sensor 38 includes e.g. a sensor element, such as a strain gauge or displacement gauge, and detects a load applied to the finger 36. The force sensor 38 sends data of the detected load to the robot controller 16. For example, the force sensor 38 sends data of the load to the robot controller 16 with a predetermined period.

The machine tool 14 includes a machine tool controller 40, a main spindle 42, a table 44, the workpiece receiving part 46, and a clamp mechanism 48. The machine tool controller 40 includes e.g. a central processing unit (CPU) and a memory (both are not shown), and directly or indirectly controls each component of the machine tool 14.

The machine tool controller 40 is connected to the robot controller 16 so as to communicate with it. The machine tool controller 40 and the robot controller 16 execute a machining process on the workpiece W while communicating with each other. Note that, this machining process will be described later.

The main spindle 42 is provided so as to be movable in directions toward and away from the workpiece receiving part 46 (i.e., in the z-axis direction in the figures). The main spindle 42 holds a tool 50 on its distal end. The machine tool controller 40 sends a command to a servo motor (not shown) built in the main spindle 42 so as to move the main spindle 42 in the z-axis direction.

By this operation of the main spindle 42, the tool 50 held by the main spindle 42 is also moved in the directions toward and away from the workpiece receiving part 46 (i.e., in the z-axis direction in the figures). Further, the machine tool controller 40 sends a command to a servo motor (not shown) built in the main spindle 42 so as to rotate the tool 50 to machine the workpiece W.

The table 44 includes a movable board 44a and a movement mechanism 44b which moves the movable board 44a. The movement mechanism 44b includes a servo motor and a ball screw mechanism, and moves the movable board 44a in the x-axis direction and the y-axis direction in FIG. 1, in accordance with a command from the machine tool controller 40.

The workpiece receiving part 46 is fixed on the movable board 44a of the table 44, and moves integrally with the movable board 44a. The workpiece receiving part 46 is formed with engagement parts 46a for positioning the workpiece W.

Figure 2:
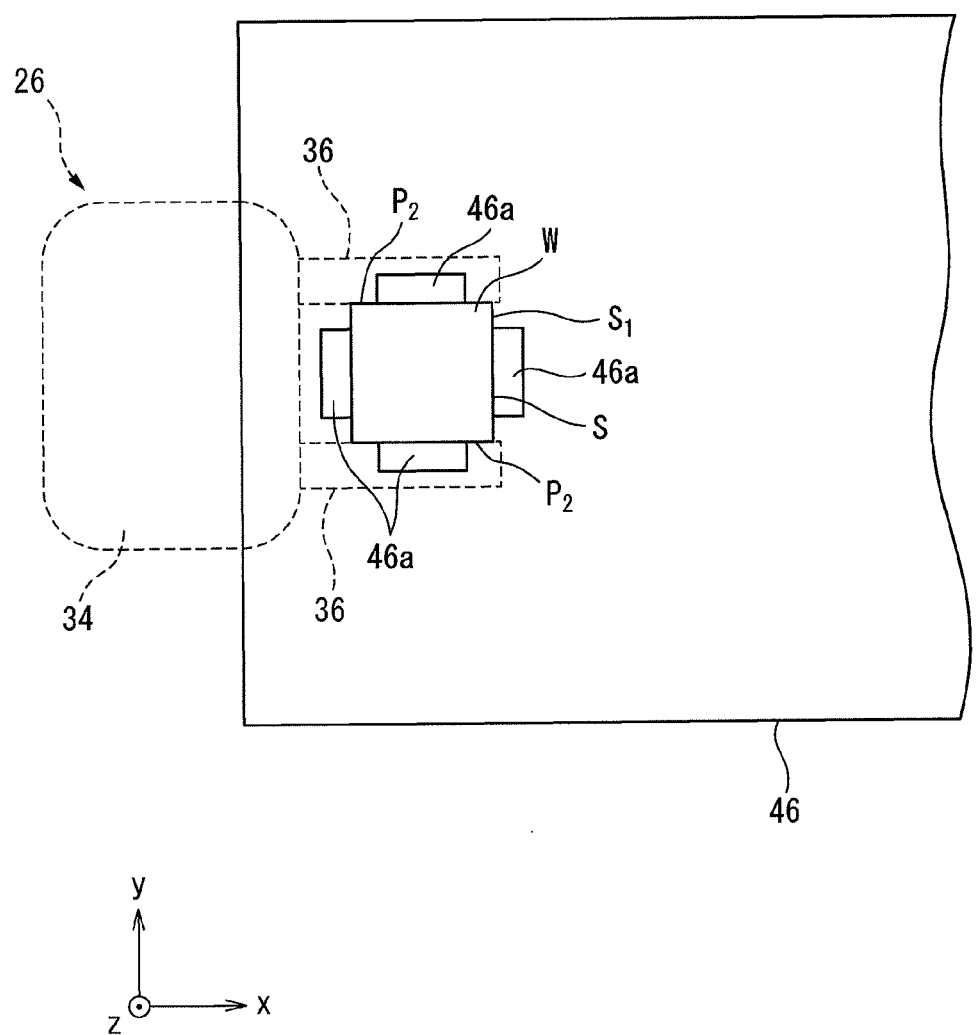
FIG. 2 is a view of the workpiece and workpiece receiving part shown in FIG. 1 when viewed from the z-axis positive direction in FIG. 1, in which a robot hand gripping the workpiece is indicated by a dotted line.

In this embodiment, a plurality of engagement parts 46a are formed so as to project from a top face 46b of the workpiece receiving part 46 in the z-axis positive direction, and are arranged so as to surround the workpiece W as shown in FIG. 2. The engagement parts 46a engage an outer peripheral surface S of the workpiece W, so that the movement of the workpiece W relative to the workpiece receiving part 46 along the x-y plane is restricted.

The clamp mechanism 48 includes a clamp driving part 52, a clamp arm 54, and a clamp part 56. The clamp driving part 52 includes e.g. a pneumatic or hydraulic cylinder, and drives the clamp arm 54 in the z-axis direction in accordance with a command from the machine tool controller 40.

One end of the clamp arm 54 is fixed to the clamp driving part 52, while the other end of the clamp arm 54 holds the clamp part 56. The clamp part 56 is arranged so as to be separate away from the engagement parts 46a formed at the workpiece receiving part 46 in the z-axis positive direction. The clamp part 56 is driven by the clamp driving part 52 in the z-axis direction integrally with the clamp arm 54.

In this embodiment, the clamp part 56 is arranged so as to contact a first part $P_1$ of the workpiece W disposed on the workpiece receiving part 46 when the clamp part 56 is moved by the clamp driving part 52 in the z-axis negative direction. The first part $P_1$ is an end of the workpiece W in the z-axis positive direction, and faces the clamp part 56.

Figure 3:
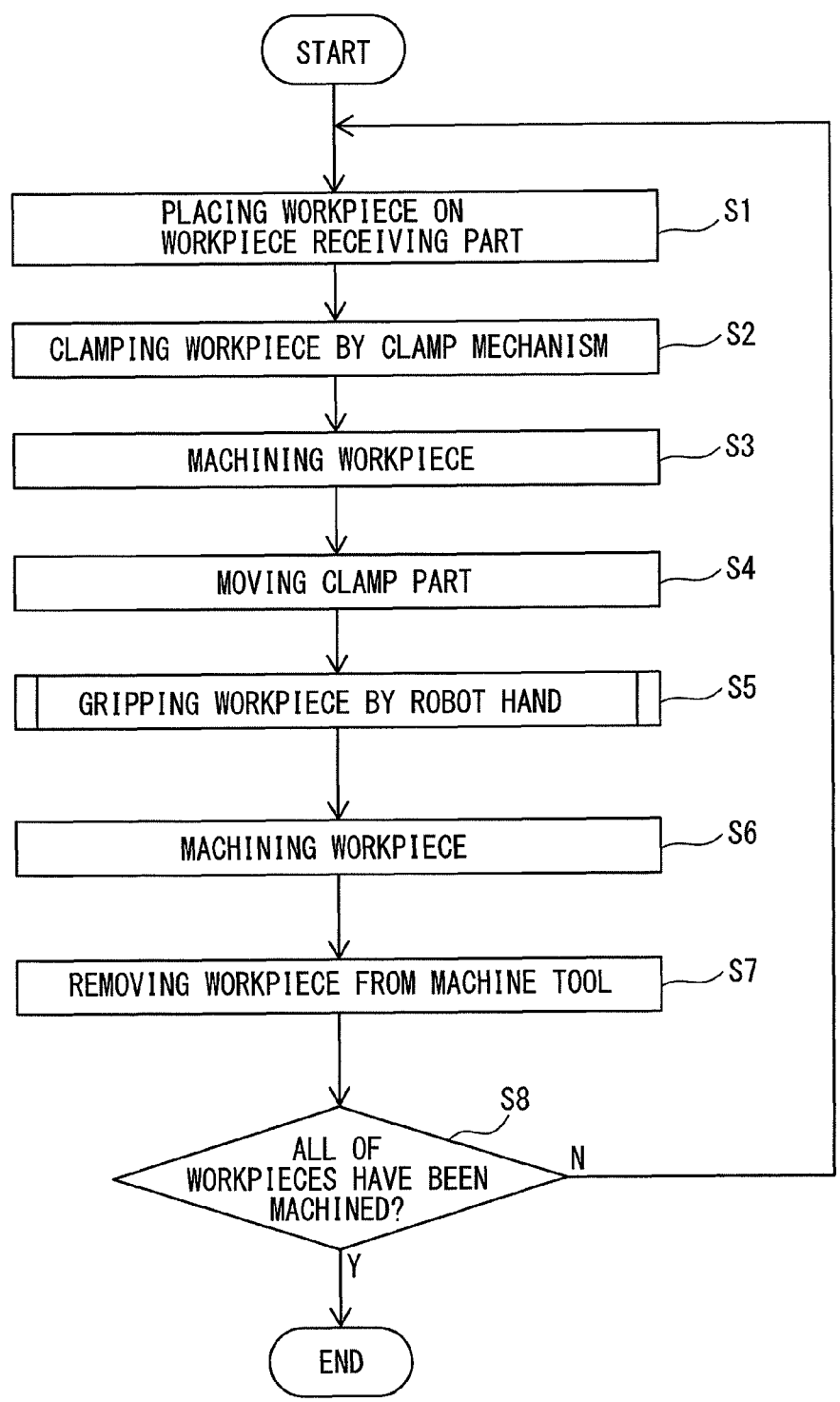
FIG. 3 is a flowchart of an example of an operation flow of the machining system shown in FIG. 1.

Next, an operation of the machining system 10 will be described with reference to FIGS. 3 to 6. The operation flow shown in FIG. 3 is started when the robot controller 16 or the machine tool controller 40 receives a machining command for machining the workpiece W from a user, host controller, or machining program.

At step S1, the robot controller 16 places the workpiece W on the workpiece receiving part 46. Specifically, the robot controller 16 operates the robot 18 in accordance with a robot program so as to grip the workpiece W placed on a predetermined location by the robot hand 26.

Then, the robot controller 16 moves the workpiece W by the robot 18, and places it on the workpiece receiving part 46. At this time, the engagement parts 46a of the workpiece receiving part 46 engage the outer peripheral surface S of the workpiece W.

At step S2, the machine tool controller 40 operates the clamp mechanism 48 so as to clamp the workpiece W placed on the workpiece receiving part 46 by the clamp mechanism 48. Specifically, the machine tool controller 40 sends a command to the clamp driving part 52 so as to move the clamp part 56 in the z-axis negative direction.

Consequently, as shown in FIG. 1, the clamp part 56 contacts the first part $P_1$ of the workpiece W so as to press the first part $P_1$ in the z-axis negative direction, thereby the workpiece W is clamped between the clamp part 56 and the workpiece receiving part 46.

At step S3, the machine tool controller 40 machines the workpiece W. Specifically, the machine tool controller 40 moves the main spindle 42 so as to contact the tool 50 with a portion of the workpiece W other than the first part $P_1$ (e.g., the outer peripheral surface S). Then, the machine tool controller 40 rotates the tool 50, thereby the workpiece W is machined.

At step S4, the machine tool controller 40 moves the clamp part 56 so as to separate away from the first part $P_1$ of the workpiece W to release the workpiece W from the clamp mechanism 48.

Figure 5:
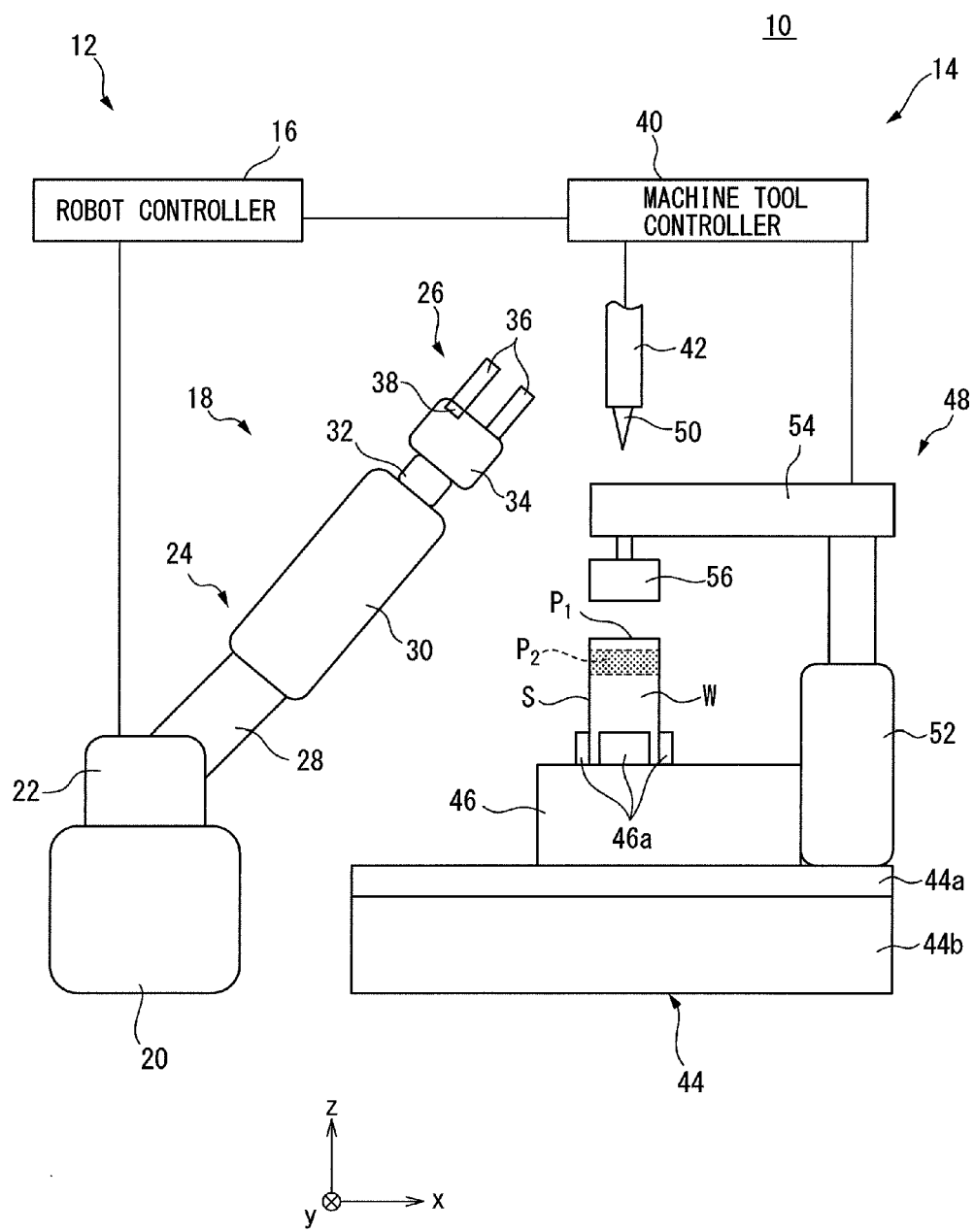
FIG. 5 shows the machining system at the end of step S4 in FIG. 3.

Specifically, the machine tool controller 40 sends a command to the clamp driving part 52 so as to move the clamp part 56 in the z-axis positive direction. Consequently, as shown in FIG. 5, the clamp part 56 is separate away from the first part $P_1$ of the workpiece W in the z-axis positive direction.

At step S5, the robot controller 16 grips the workpiece W by the robot hand 26. This Step S5 will be described with reference to FIG. 4.

At step S11, the robot controller 16 moves the robot hand 26. Specifically, the robot controller 16 operates the robot 18 in accordance with a robot program so as to move the robot hand 26 so that the workpiece W is arranged between the opened fingers 36.

At this time, the robot hand 26 is positioned relative to the workpiece W so that the fingers 36 face a second part P (FIG. 2, FIG. 5) of the workpiece W. The second part $P_2$ is a part of the workpiece W other than the first part $P_1$ (e.g., the outer peripheral surface S), and this second part $P_2$ is to be gripped by the robot hand 26 as described later.

At step S12, the robot controller 16 moves the fingers 36 in closing directions. Specifically, the robot controller 16 sends a command to the servo motor built in the robot hand 26 so as to move the fingers 36 in the direction toward each other.

At step S13, the robot controller 16 determines whether a pressing force, by which the robot hand 26 presses the second part $P_2$ of the workpiece W, reaches a predetermined value. Specifically, the robot controller 16 determines whether the detected load value measured by the force sensor 38 is within a predetermined range.

As described above, the force sensor 38 detects the load applied to the finger 36. The load applied to the finger 36 correlates with a reaction force applied to the finger 36 when the fingers 36 press the second parts $P_2$. Accordingly, the pressing force by which the robot hand 26 presses the second part $P_2$ can be estimated from the load detected by the force sensor 38.

As an example, a relationship between the load value detected by the force sensor 38 and the pressing force by which the robot hand 26 presses the second parts $P_2$ is obtained in advance by means of an experimental or simulation method, and is pre-stored in the storage incorporated in the robot controller 16.

Then, a user sets the above-mentioned predetermined range so as to include the detected load value of the force sensor 38 when the pressing force by which the robot hand 26 presses the second parts $P_2$ is a desired value (e.g., a range of ±1% of the detected load value corresponding to the desired pressing force).

At this step S13, the robot controller 16 determines whether the load value detected by the force sensor 38 is within the predetermined range. When the robot controller 16 determines that the detected load value is within the predetermined range (i.e., determines "YES"), it proceeds to step S14.

On the other hand, when the robot controller 16 determines that the load value detected by the force sensor 38 is out of the predetermined range (i.e., determines "NO"), it repeats step S13

Figure 6:
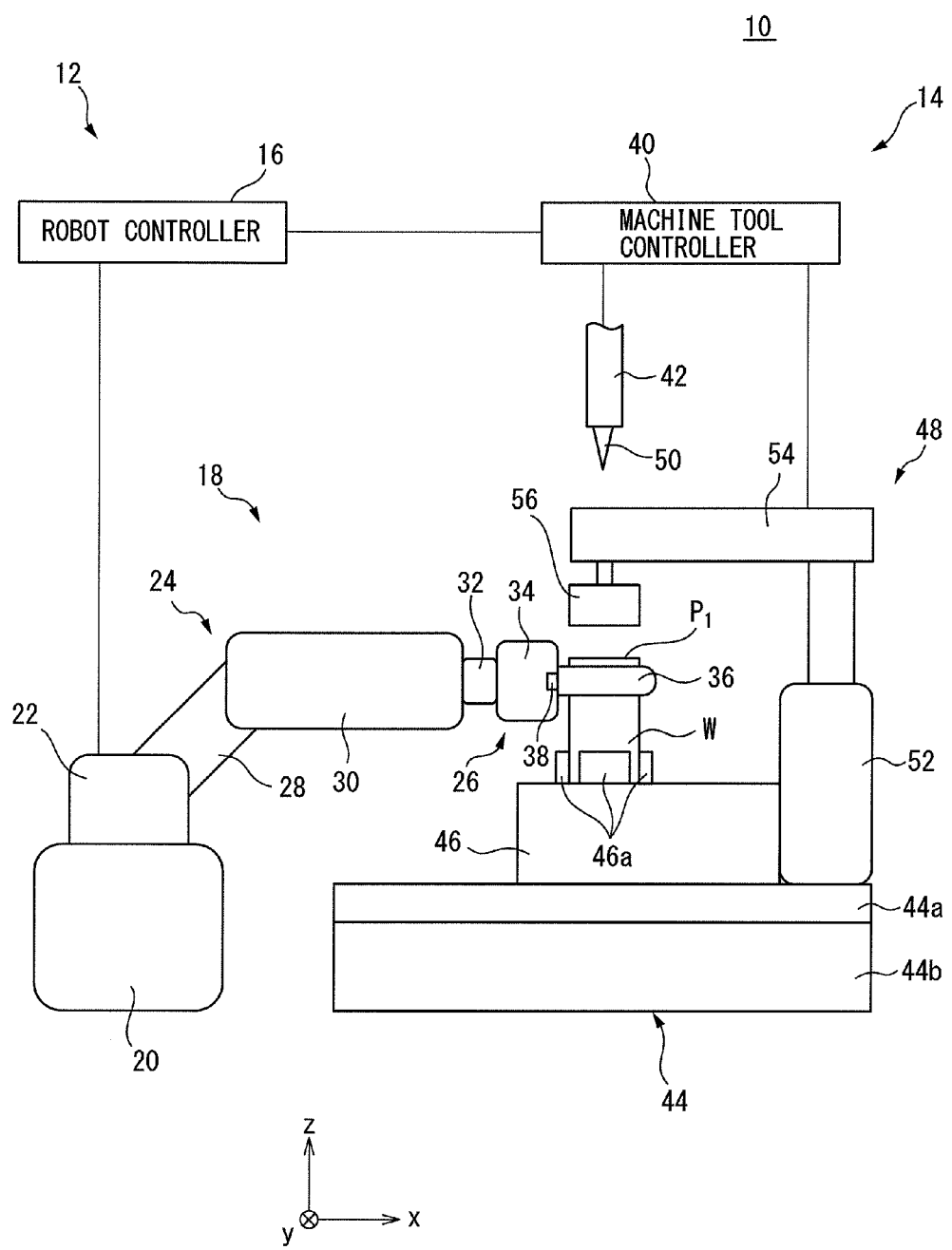
FIG. 6 shows the machining system at the time when it is determined "YES" at step S13 in FIG. 4.

When it is determined "YES" at step S13, the robot hand 26 presses the second parts $P_2$ of the workpiece W by a desired magnitude of force. This state is shown in FIGS. 2 and 6. Note that, in FIG. 2, the robot hand 26 is indicated by a dotted line for the purposes of easy understanding.

As shown in FIGS. 2 and 6, when it is determined "YES" at step S13, the second parts P of the workpiece W is held between the fingers 36 of the robot hand 26 in the y-axis direction, and gripped by them.

As shown in FIG. 6, in this embodiment, the second parts $P_2$ are disposed in the vicinity of the end of the workpiece W in the z-axis positive direction so as to be spaced away from the engagement parts 46a of the workpiece receiving part 46 in the z-axis positive direction. On the other hand, the engagement parts 46a of the workpiece receiving part 46 engage the end part of the workpiece W in the z-axis negative direction.

Thus, in this embodiment, the robot hand 26 and each engagement part 46a engage different parts of the workpiece W (i.e., the robot hand 26 engages the vicinity of the upper end of the workpiece W, while each engagement part 46a engages the vicinity of the lower end of the workpiece W).

Due to this, it is possible to effectively restrict the movement of the workpiece W relative to the workpiece receiving part 46 along the x-y plane. Further, it is possible to effectively prevent the end part of the workpiece W in the z-axis positive direction from swinging, thereby it is possible to prevent the workpiece W from being inclined with respect to the x-y plane, during the machining process.

At step S14, the robot controller 16 maintains the position of the fingers 36. For example, the robot controller 16 measures a load torque N of the servomotor for driving the fingers 36 at the time when it is determined "YES" at step S13, and feedback-controls the servomotor so that a load torque thereof is the measured load torque N.

By this operation, the position of the fingers 36 can be maintained, thereby the robot hand 26 can keep gripping the second parts $P_2$ by the desired magnitude of force.

Figure 4:
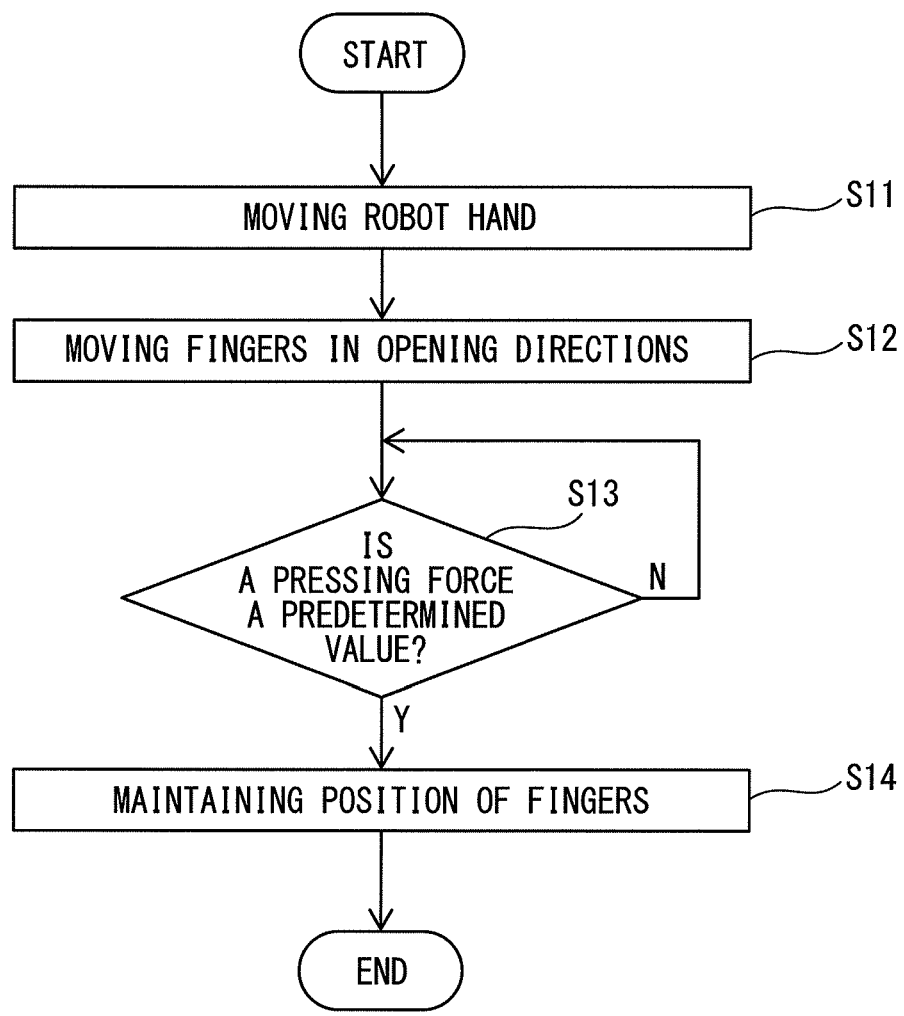
FIG. 4 is a flowchart of an example of the flow of step S5 in FIG. 3.

By step S5 shown in FIG. 4, the robot hand 26 presses the workpiece W, which has been released from the clamp mechanism 48 at step S4, against the workpiece receiving part 46, without changing the posture of the workpiece W at the end of step S3.

Referring again to FIG. 3, at step S6, the machine tool controller 40 machines the first part $P_1$ of the workpiece W. Specifically, the machine tool controller 40 operates the main spindle 42 so as to press the tool 50 against the first part $P_1$ of the workpiece W in the z-axis negative direction. Then, the machine tool controller 40 rotates the tool 50, thereby the first part $P_1$ of the workpiece W is machined.

As described above, the movement of the workpiece W in the x-y plane is restricted by the robot hand 26 and the engagement parts 46a. In this state, the tool 50 machines the first part $P_1$ along with pressing the first part $P_1$ in the z-axis negative direction, by which it is possible to effectively prevent the position of the workpiece W from deviating during machining.

At step S7, the robot controller 16 removes the workpiece W from the machine tool 14. Specifically, while the robot controller 16 keeps gripping the workpiece W by the robot hand 26, the robot controller 16 operates the robot 18 in accordance with a robot program so as to move the workpiece W to a predetermined location. Then, the robot controller 16 moves the fingers 36 of the robot hand 26 in opening direction so as to release the workpiece W to the predetermined location.

At step S8, the robot controller 16 or the machine tool controller 40 determines whether all of workpieces have been machined. When the robot controller 16 or machine tool controller 40 determines that all of workpieces have been machined (i.e., determines "YES"), it ends the flow shown in FIG. 3. On the other hand, when the robot controller 16 or machine tool controller 40 determines that a workpiece to be machined still remains (i.e., determines "NO"), it returns to step S1.

In this embodiment, after the workpiece W is released from the clamp part 56, the robot hand 26 presses the workpiece W against the workpiece receiving part 46 without changing the posture of the workpiece W.

According to this configuration, after step S3, the first part $P_1$, against which the clamp part 56 was butted at step S3, can be sequentially machined without changing the posture of the workpiece W. Accordingly, it is possible to omit operations for e.g. changing the posture of the workpiece W or setting the workpiece W to another jig after step S3, thereby the production efficiency can be improved.

Further, in this embodiment, while the movement of the workpiece W in the x-y plane is restricted by the robot hand 26, the tool 50 is pressed against the first part $P_1$ in the z-axis negative direction to machine. According to this configuration, it is possible to effectively prevent the movement of the workpiece W in the x-axis, the y-axis, and the z-axis directions during machining.

Further, in this embodiment, the workpiece W is pressed against the workpiece receiving part 46 by the robot 18 for carrying and removing the workpiece W into and from the machine tool 14. Due to this, the configuration of the system can be simplified.

Further, since the robot hand 26 is gripping the workpiece W at step S5, the machined workpiece W can be quickly removed at step S7 by the robot 18 after the end of step S6. Accordingly, the work efficiency can be improved.

Figure 7:
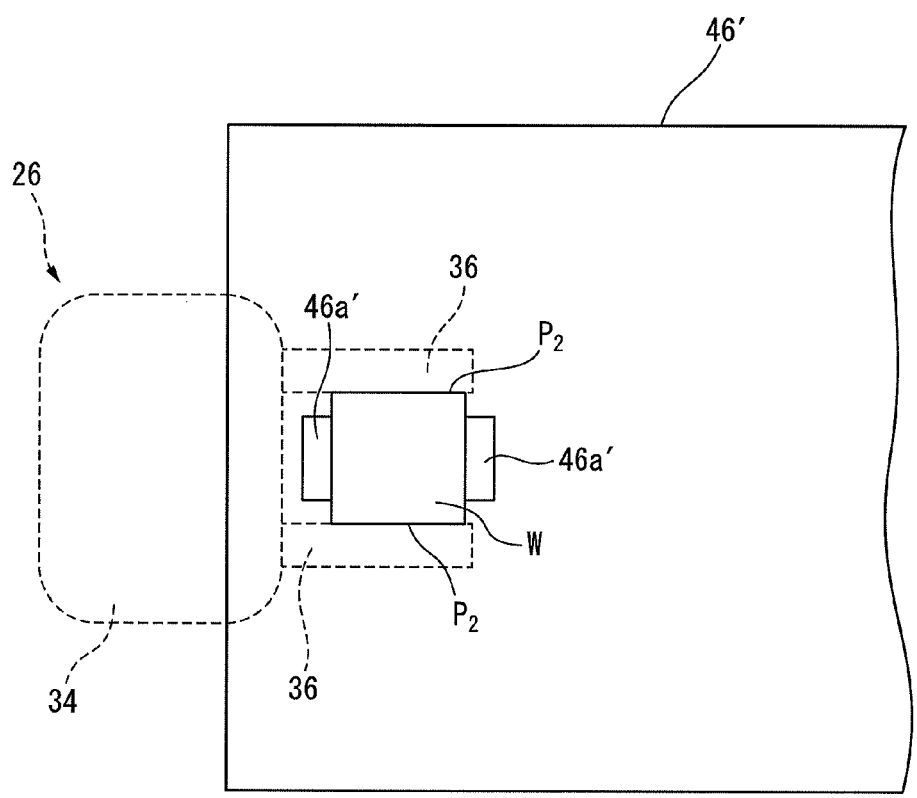
FIG. 7 is a view of a workpiece receiving part according to another embodiment of the invention.

Note that, various types of engagement parts other than the engagement parts 46a of the above-mentioned embodiment can be applied. FIG. 7 shows a workpiece receiving part 46' according to another embodiment. The workpiece receiving part 46' is formed with two engagement parts 46a' arranged to be opposite to each other.

These engagement parts 46a' are formed to restrict the movement of the workpiece W in the x-axis direction. In this case, at the above-mentioned step S5, the robot controller 16 causes the robot hand 26 to grip the second parts $P_2$ of the workpiece W so as to restrict the movement of the workpiece W in the y-axis direction, as shown in FIG. 7.

Thus, in this embodiment, the robot hand 26 and the engagement parts 46a' respectively restrict the movements of the workpiece W in the y-axis direction and the x-axis direction. Due to this, it is possible to restrict the movement of the workpiece W along the x-y plane.

Figure 8:
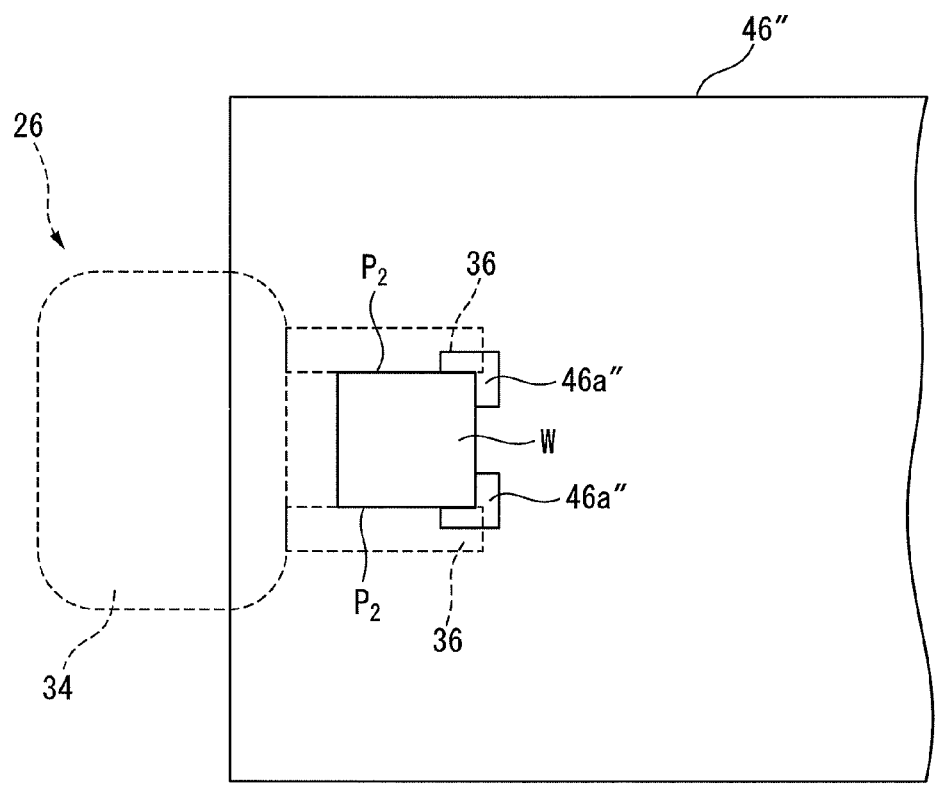
FIG. 8 is a view of a workpiece receiving part according to still another embodiment of the invention.

FIG. 8 shows a workpiece receiving part 46" according to still another embodiment. The workpiece receiving part 46" is formed with two engagement parts 46a" arranged to be opposite to each other. These engagement parts 46a" are formed to restrict the movement of the workpiece W in the x-axis positive direction.

In this embodiment, at the above-mentioned step S5, the robot controller 16 causes the robot hand 26 to grip the second parts $P_2$ of the workpiece W so as to restrict the movement of the workpiece W in the y-axis direction.

In this state, the robot controller 16 moves the robot hand 26 in the x-axis positive direction so as to press the workpiece W against the engagement parts 46a" in the x-axis positive direction. According to this embodiment, it is also possible to restrict the movement of the workpiece W along the x-y plane by the robot hand 26 and the engagement parts 46a".

Further, the robot 18 may be provided with other force sensor capable of detecting a load applied to the robot arm 24, instead of (or in addition to) the force sensor 38. The other force sensor can be attached to the robot arm 24 or the wrist 32.

In this case, at the above-mentioned step S13, the robot controller 16 may determine whether a force by which the robot hand 26 presses the second parts $P_2$ reaches a predetermined value, based on the load measured by the other force sensor.

As an example, if the workpiece receiving part 46" shown in FIG. 8 is applied, at the above-mentioned step S13, the robot controller 16 may control a force by which the robot hand 26 presses the workpiece W against the engagement parts 46a" in the x-axis positive direction, based on the load measured by the other force sensor.

Further, the clamp driving part 52 may include e.g. a servomotor, other than the pneumatic or hydraulic cylinder.

Figure 9:
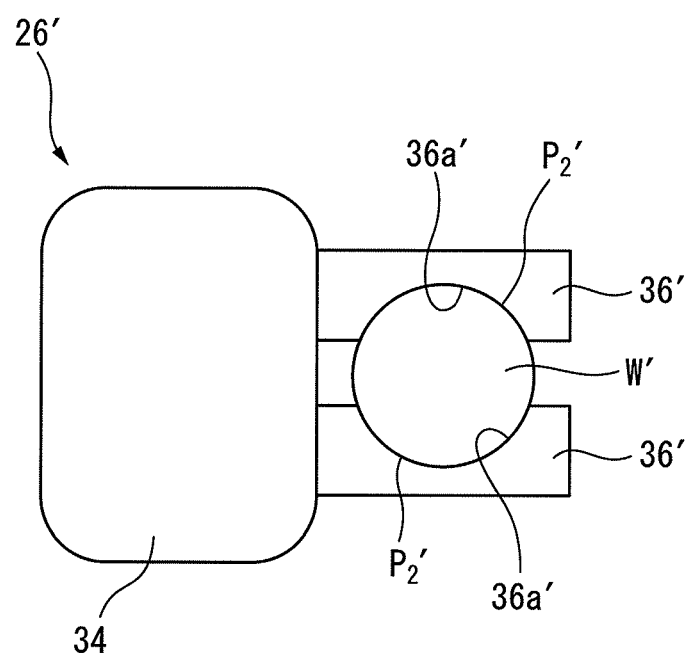
FIG. 9 is a view of a robot hand according to another embodiment of the invention.

Further, the workpiece W may be pressed against the workpiece receiving part only by the robot hand, without providing any engagement part on the workpiece receiving part. As an example, FIG. 9 shows a robot hand 26' according to another embodiment.

The robot hand 26' includes a hand base 34 and a plurality of fingers 36' provided at the hand base 34 so as to open and close. The fingers 36' are provided at the hand base 34 so as to move closer to and away from each other.

A gripping part 36a' is formed at a portion of each finger 36', against which the workpiece W' to be gripped is butted. Each gripping part 36a' has a shape corresponding to the second parts $P_2'$ of the workpiece W'. According to this embodiment, even if the engagement parts 46a are not provided on the workpiece receiving part 46, it is possible to restrict the movement of the workpiece W' in the x-y plane by the robot hand 26'.

Further, the engagement part may be not only a projecting part projecting from the surface of the workpiece receiving part, as the above-mentioned engagement parts 46a, 46a' and 46", but also a recessed part (e.g. groove) inwardly recessed from the surface of the workpiece receiving part.

Further, in the above-mentioned embodiments, the machine tool 14 includes single clamp mechanism 48. However, the machine tool may include a plurality of clamp mechanisms.

Figure 10:
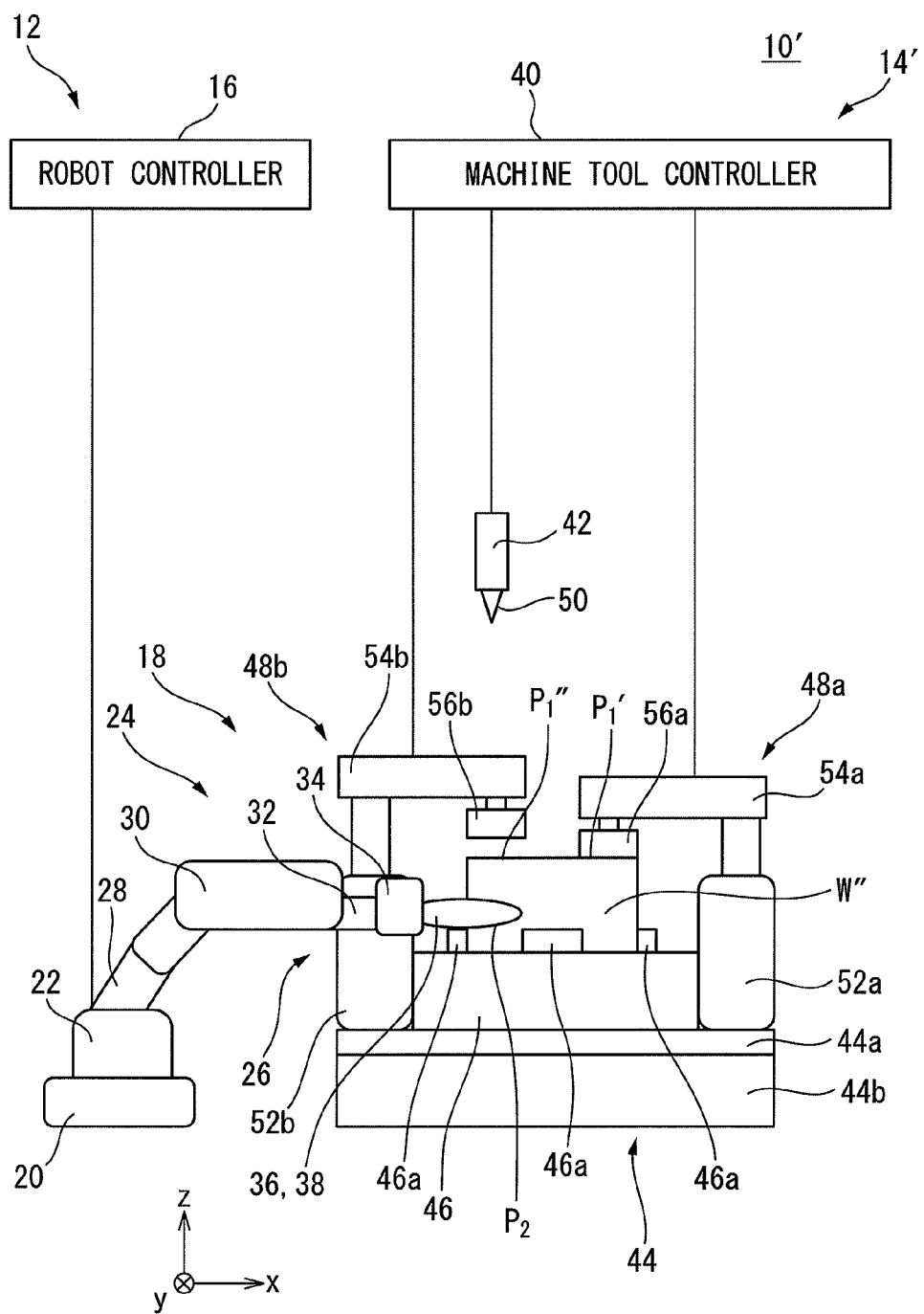
FIG. 10 is a block diagram of a machining system according to another embodiment of the invention.

Below, a machining system 10' according to still another embodiment will be described with reference to FIG. 10. Note that, in this embodiment, elements similar to those in the above-mentioned embodiments are assigned the same reference numerals, and the detailed descriptions thereof will be omitted.

The machining system 10' differs from the machining system 10 in the configuration of the machine tool 14'. Specifically, the machine tool 14' includes the machine tool controller 40, the main spindle 42, the table 44, the workpiece receiving part 46, a first clamp mechanism 48a, and a second clamp mechanism 48b.

The first clamp mechanism 48a includes a first clamp driving part 52a, a first clamp arm 54a, and a first clamp part 56a. The second clamp mechanism 48b includes a second clamp driving part 52b, a second clamp arm 54b, and a second clamp part 56b.

The configurations of the clamp driving parts 52a, 52b, the clamp arms 54a, 54b, and the clamp parts 56a, 56b are respectively similar to those of the clamp driving part 52, the clamp arm 54, and the clamp part 56.

The first clamp part 56a is disposed so as to contact a portion $P_1'$ of a workpiece W'" placed on the workpiece receiving part 46. On the other hand, the second clamp part 56b is disposed so as to contact a portion $P_1"$ of the workpiece W'".

Next, the operation of the machining system 10' according to this embodiment will be described with reference to FIG. 3. The operation of the machining system 10' differs from that of the machining system 10 in the following processes.

Specifically, at step S4, the machine tool controller 40 sends a command to the first clamp driving part 52a so as to move the first clamp part 56a away from the portion $P_1'$ of the workpiece W.

Then, after executing step S5, at step S6, the machine tool controller 40 operates the main spindle 42 so as to machine the portion $P_1'$ of the workpiece W. Then, the machine tool controller 40 sends a command to the second clamp driving part 52b so as to move the second clamp part 56b away from the portion $P_1"$ of the workpiece W.

Then, the machine tool controller 40 operates the main spindle 42 so as to machine the portion $P_1"$ of the workpiece W. According to this embodiment, it is possible to sequentially machine the portion $P_1'$ against which the first clamp part 56a was butted at step S3 and the portion $P_1"$ against which the second clamp part 56b was butted at step S3, without changing the posture of the workpiece W'".

Note that, regarding the operation of the machining system 10', the machine tool controller 40 may move both of the first clamp part 56a and the second clamp part 56b away from the portions $P_1'$ and $P_1"$ of the workpiece W concurrently at step S4.

Note that, in the above-mentioned embodiments, the robot controller 16 and the machine tool controller 40 are provided to be independent elements separate from each other. However, a single controller which controls each component of the robot 18 and the machine tool 14 may be provided.

Although the invention has been described above through various embodiments, the embodiments do not limit the inventions according to the claims. Further, a configuration obtained by combining the features described in the embodiments of the invention can be included in the technical scope of the invention. However, all combinations of these features are not necessarily essential for solving means of the invention. Furthermore, it is obvious for a person skilled in the art that various modifications or improvements can be applied to the embodiments.

Regarding the order of operations, such as actions, sequences, steps, processes, and stages, in the devices, systems, programs, and methods indicated in the claims, specification and drawings, it should be noted that the terms "before", "prior to", etc. are not explicitly described, and any order can be realized unless the output of a previous operation is used in the subsequent operation. Regarding the processing in the claims, specification, and drawings, even when the order of operations is described using the terms "first", "next", "subsequently", "then", etc., for convenience, maintaining this order is not necessarily essential for working the inventions.

The invention claimed is:

1. A method of machining a workpiece by cooperation of a machine tool including a workpiece receiving part on which the workpiece is placed and a clamp part which presses the workpiece against the workpiece receiving part, and a robot including a robot hand capable of gripping the workpiece, the method comprising:

operating the robot to grip the workpiece by the robot hand and place the workpiece on the workpiece receiving part;

pressing the clamp part against a first portion of the workpiece and clamping the workpiece between the clamp part and the workpiece receiving part;

moving the clamp part so as to separate away from the first portion and release the workpiece from the clamp part without changing the posture of the workpiece;

operating the robot so as to grip a second portion of the workpiece different from the first portion by the robot hand and restrict a movement of the workpiece relative to the workpiece receiving part without changing a posture of the workpiece; and operating the machine tool so as to machine the first portion when restricting the movement of the workpiece relative to the workpiece receiving part.

2. The method according to claim 1, wherein the robot includes a force sensor which measures a force applied to the robot hand, wherein, when the second portion is gripped by the robot hand, a pressing force by which the robot hand presses the second portion is controlled to a predetermined value based on the force measured by the force sensor.

* * * * *